Sept. 16, 1924.
G. N. SIMPSON ET AL
1,508,997
AUTOMATIC CAR HOLDING MECHANISM
Filed Aug. 5, 1921
2 Sheets-Sheet 1
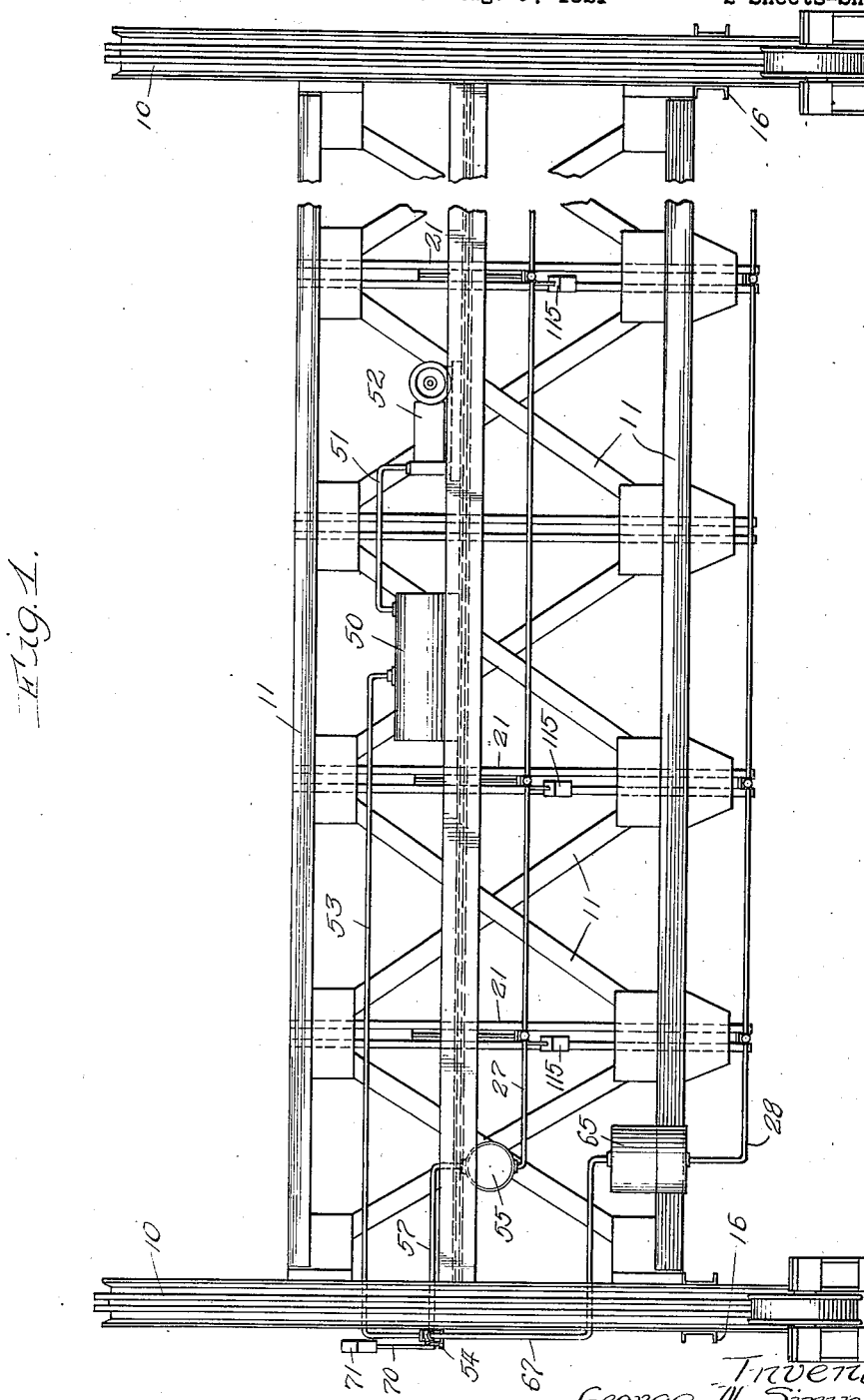

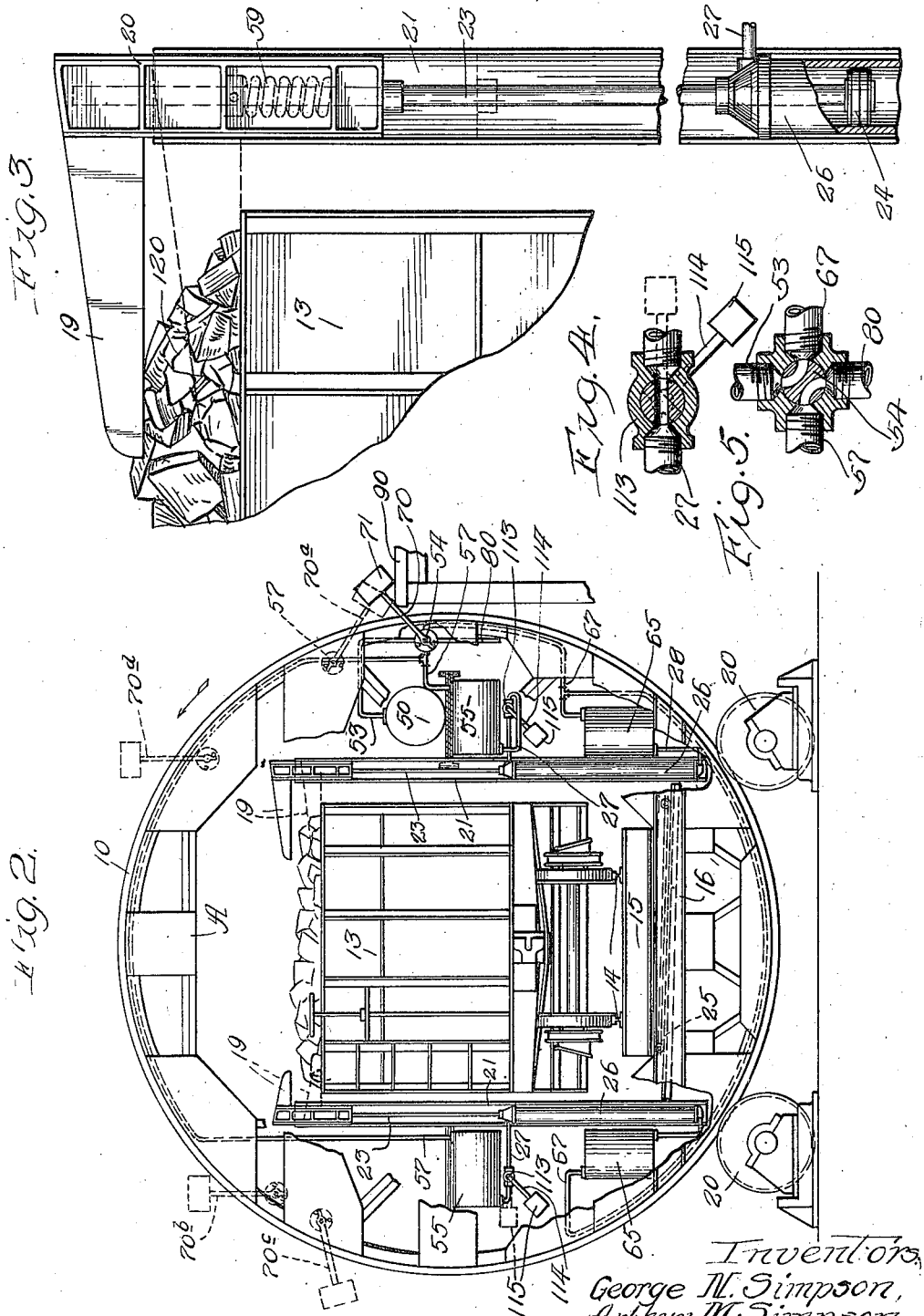
Sept. 16, 1924. 1,508,997
G. N. SIMPSON ET AL
AUTOMATIC CAR HOLDING MECHANISM
Filed Aug. 5, 1921 2 Sheets-Sheet 2

Patented Sept. 16, 1924.

1,508,997

UNITED STATES PATENT OFFICE.

GEORGE N. SIMPSON, OF PITTSBURGH, PENNSYLVANIA, AND ARTHUR M. SIMPSON, OF CHICAGO, ILLINOIS.

AUTOMATIC CAR-HOLDING MECHANISM.

Application filed August 5, 1921. Serial No. 489,941.

*To all whom it may concern:*

Be it known that we, GEORGE N. SIMPSON and ARTHUR M. SIMPSON, citizens of the United States, residing at Pittsburgh, Pennsylvania, and 1220 East 75th Street, Chicago, Illinois, respectively, in the county of Cook and State of Illinois, have invented a new and useful Improvement in Automatic Car-Holding Mechanism, of which the following is a specification.

This invention relates to improvements in automatic car holding mechanism and more especially to such a mechanism adapted to be used in connection with car dumping apparatus in which the dumping of a car is effected by rotation thereof. In such apparatus it is necessary to provide some means for holding the car on its rails in its inverted positions.

We have shown the mechanism adapted for use in an apparatus in which a car is moved into a rotatable cage and then dumped by rotating the cage. It is obvious, however, that, without detracting from the spirit of our invention, the principles of our invention may be used either with or without modifications, in connection with any kind of dumping apparatus, in which it is necessary or desirable to hold a car on its rails in inverted positions.

In that form of device embodying the features of our invention shown in the accompanying drawings, Fig. 1 is a view in side elevation of a car dumper, Fig. 2 is a view of the same in end elevation, Fig. 3 is an enlarged fragmentary view of one of the clamping hooks, Fig. 4 is an enlarged sectional view showing the construction and operation of the valve 113, and Fig. 5 is an enlarged sectional view showing the construction and operation of the valve 54.

In that form of device embodying the features of our invention shown in the accompanying drawings, A indicates in general a substantially cylindrical rotatable cage, comprising end rings 10 suitably connected, supported and strengthened by struts, braces and framing, indicated in general by 11. The interior of the cage is sufficiently free from bracing members and the like to permit entry of a car such as is indicated by 13. Arranged within the cage A are suitable rails 14 forming a track section supported on ties 15 which are supported within the cage in any desired manner, as, for example, on transversely arranged channel members 16. Arranged at one end of the cage 10, not shown in the drawings, is a fixed receiving track, and at the other end is a fixed discharge track lying in alinement with the track 14, when the cage is in its normal upright position. In the operation of the cage, a car, such as the car 13, is moved from the fixed receiving track, into the cage A onto the rails 14. The cage A, which is supported by rings 10 resting on rollers 20, is then rotated by any suitable means, thus causing inversion of the car 13 and consequent dumping. The cage A is then restored to its normal upright position and the car 13 is moved out of the cage onto the fixed discharge track and carried away. Since the bodies of cars which it is desired to dump are not of a uniform width, the space in the cage adapted to accommodate the car body is made somewhat wider than the widest car body, and means are provided for permitting the car to slide over to one side at the commencement of the rotation of the cage in order to permit the car to rest against the side of the cage, and thus make its support within the cage easier. In order to permit this sideways movement of the car, the track section 14, mounted on ties 15, is supported on rollers 25 interposed between the ties 15 and the supporting member 16 in any desired manner. By this construction the track section 14 is mounted in the manner of a rolling platen, permitting the entire track section in the cage to have a certain amount of sideways movement; so that after the car is run into the cage, and rotation commenced the track section and car will move over to one side (to the left as viewed in Fig. 2) to permit the car to rest against this side of the cage. The direction of rotation of the cage is indicated by the arrow in Fig. 2. The construction of the cage, its general manner of operation, and the rolling platen track section, are old in the art, and form no part of the present invention, and thus have been described only generally.

It is obvious that in the dumping of a car as described above, means must be provided for holding the car on the rails 14 in its inverted positions. We have provided means for automatically accomplishing this and our invention lies in such means, which will be described more in detail hereinafter. The advantages of our construction will appear more fully as we proceed with our specification.

Our automatic car holding mechanism comprises in general a series of hooks 19 arranged on each side of the interior of the cage A, projecting inwardly above the car body 13 and adapted to be lowered into engagement with the car body to hold the car on the rails 14 when the cage A is rotated. Each of these hooks projects from a casting 20, suitably mounted in guides 21, of any desired form, vertically arranged at the sides of the car. Each of the castings 20 has depending from it a rod 23, having on its lower end a piston 24 adapted for reciprocation in a vertical cylinder 26. A spring 59 is mounted on the upper end of the rod 23 and interposed between the hook 19 and such rod 23. The particular function and construction of such a spring is described and claimed in an accompanying application. It will suffice to state here generally that the purpose of the spring is to form a spring support for the weight of the car when the cage A is inverted and the entire weight of the car rests on the hooks 19.

In Fig. 2 the hooks 19 are shown in broken lines in their lowered positions in engagement with the car body 13 to hold the same on its track when the cage A is rotated. This lowering of the hooks 19 is caused by downward movement of the rods 23. Since the operation of each of the hooks is substantially the same, we will describe in detail the manner of operating but one.

The piston 24 is mounted in the cylinder 26 which has a pipe 27 entering its upper end and a pipe 28 entering its lower end. It is obvious that fluid introduced under pressure in the pipe 27 will operate to move the piston 24 downwardly and thus pull down the hook 19; and that fluid admitted under pressure through the pipe 28 to the lower end of the cylinder will raise the piston 24 and thus raise the hook 19. Means are provided for automatically admitting fluid under pressure to cause the desired movement of the hooks. Although we have shown, for the purpose of operating the pistons 24, the use of compressed air and oil, it is obvious that any other fluid or combination of fluids, as desired, may be used without detracting from the spirit of this invention. Mounted within the cage A is a compressed air tank 50 connected by a pipe 51 to an air compressor 52 and arranged in any well known manner to maintain constantly within the tank 50 a suitable supply of air under any desired pressure. From the tank 50 a pipe 53 leads to a valve 54, mounted at one end of the cage A. In connection with each of the cylinders 26 is an accumulator tank 55 containing oil and having a pipe 27 connected to its bottom with the top of the cylinders 26. A pipe 57 leads from the top of the tank 55 to the valve 54. In connection with each of the cylinders 26 is also another accumulator tank 65, having its bottom likewise connected by a pipe 28, to the bottom of the cylinder 26. The accumulator tank 65 also contains a supply of oil and has a pipe 67 leading from its top to the valve 54. The valve 54 may be any well known construction and is adapted to be operated by a lever 70 having a gravity operating weight 71, mounted on its end. It is so constructed that when the lever 70 is in the position shown by the solid lines in Fig. 2, air under pressure is admitted from the tank 50 through the pipe 53, through the valve 54, into the pipe 67, and thence into the top of the accumulator tank 65. This pressure in the top of the tank 65 will force the oil therefrom into the bottom of the cylinder 26 to raise the piston 24 and consequently raise the hook 19. Here it will be noted that the pipe 67 has suitable branches connecting it to all of the tanks 65, so that all of the hooks 19 will be raised in the same manner. When the valve 54 is in this position, so that pressure is supplied to the accumulator tanks 65, the pipe 57 is connected through the valve 54 to the exhaust pipe 80, thus opening the top of the tank 55 to the atmosphere. The pipe 57 has likewise suitable connections on it to all the other tanks 55. By this construction it will be seen that when the valve is in the position shown in Fig. 2, that oil will be forced from the tanks 65 into the bottoms of the cylinders 26 to raise the hooks 19, and upward movement of the pistons 24 will be permitted to force the oil above such pistons back into the tanks 55, the air being permitted to escape from such tanks 55 through the pipe 57, thence through the valve 54, and thence through the pipe 80 to the atmosphere. When the cage is in its normal upright position, the valve 54 is held in the position shown in Fig. 2 by the weight 71 which rests upon any suitable shelf or stationary support 90 arranged at one side of the cage A.

The direction of rotation of the cage A is shown by the arrow in Fig. 2. It will be noted that as rotation of the cage starts, gravity will tend to keep the weight 71 on the support 90 with a consequent relative downward movement of the lever 70 with respect to the side of the cage upon which it is mounted resulting in turning the valve 54. The valve 54 is so constructed that such movement of the lever 70 operates to admit air under pressure from the pipe 53 into the pipes 57, and to close the communication of such pipes 57 with the atmosphere. Such movement of the valve 54 also shuts off the pressure from the pipes 67 and opens such pipes to the atmosphere through the pipe 80.

It will be seen therefore that after the cage has rotated a few degrees or sufficiently to cause the arm 70 to be moved to open the valve 54 to the required amount, air will be admitted under pressure to the tank 55, with the result that oil will be forced into the cylinders 26 above the pistons 24, to lower such pistons and pull the hooks downwardly. This downward movement will be permitted by the connection of the pipe 67 through the valve 54 to the atmosphere through the pipe 80, thus permitting oil in the cylinders 26 to flow back through the pipes 28 into the tanks 65. It will be seen by this construction that as soon as the cage A has rotated about thirty degrees, when the lever 70 is in a position indicated by 70ª, fluid will be admitted under pressure to the tops of the cylinders 26 to pull the hooks 19 down. The valve 54 is so adjusted that its full movement will be accomplished by movement of the lever 70 from the position shown by the solid lines in Fig. 2 to the position indicated by the broken lines 70ª. From this point the lever 70ª will remain in the position indicated by the broken lines and the hooks 19 will be pulled toward the car until the cage rotates sufficiently so that the lever 70 will be in a vertical position as indicated by the broken lines 70ᵇ. This position indicates a rotation of the cage of approximately 135 degrees. The limit of rotation of the cage ordinarily is approximately 145 degrees, as this is ordinarily sufficient to accomplish the dumping of the car. If rotation does not go beyond the point where the lever 70 assumes a vertical position, it is obvious that the pressure will remain on the upper ends of the cylinder 26 during the entire dumping operation, and until the dump again resumes its normal upright position, causing contact of the weight 71 with the support 90 to automatically operate the valve 54, to change the pressure from the tops of the cylinders 26 to the bottoms, thus causing automatic raising of the hooks 19; where the apparatus will again be in a position to receive a new car. Subsequent rotation will again automatically cause operation of the valve 54, as described, and consequent automatic lowering of the hooks 19. It will be seen therefore that operation of the hooks upwardly and downwardly is entirely automatic and is controlled by rotation of the cage A.

The pressure used to pull the hooks 19 downwardly against the car is ordinarily not sufficient to hold the car on the rails during the dumping operation. For this reason gravity operated valves 113 are provided on the pipes 27 connecting the upper ends of the cylinder 26 to the tanks 55. These valves 113 have connected to them levers 114 which have gravity-operated weights 115 on their ends. The operation and purpose of these valves are as follows. These valves are so constructed that the limit of their operation is from the position indicated by solid lines in Fig. 2 to that indicated by broken lines. The valves 113 are so constructed that when the lever 114 is in the position indicated by the solid lines the pipe 27 is open; and when it is in the position indicated by the broken lines, the pipe 27 is closed. It is obvious that rotation of the cage will move the weights 115 from the position indicated by the solid lines to the position indicated by the broken lines. About 90 degrees or less of rotation will be required to accomplish such movement. The purpose of these valves is to lock the liquid in the upper ends of the cylinders 26 when the cage has rotated about 90 degrees, thus firmly holding and locking the hooks 19 to hold the car on the rails during the subsequent rotation to effect the dumping of the car. As stated before, the hooks are usually pulled down with a relatively light pressure which is not sufficient to hold the car on the rails. The closing of the valves 113 locks the oil in the cylinders and prevents displacement of the hooks under the heavy weight of the car during the overturning and dumping operation. Also, such locking of the hooks 19 insure the holding of the car on the rails in case the cage A should rotate so far that the lever 70 would pass its vertical position and fall to its other position as indicated by 70ᶜ, thus cutting off air pressure to the tanks 55 and admitting it to the tanks 65. In such case the liquid would nevertheless be locked in the cylinders 26 by the valves 113 and the hooks 19 would be locked firmly in place against the edges of the car body. Upon reverse rotation of the cage A, the valves 113 hold the liquid locked in the cylinders 26 until the cage returns to such a position that the car by gravity will remain on the tracks.

We have stated that the pressure used ordinarily is not sufficient to pull the hooks 19 down strong enough to hold the car on the rails, and that therefore the hooks must be locked down by the valves 113. It is obvious, however, that, without detracting from the spirit of our invention, the pressure used could be as great as desired, and strong enough to pull the hooks down with enough force to hold the car on the rails so that the valves 113 could be dispensed with. In such case, however, it is obvious that rotation should not be carried to such an extent as to cause the lever 70 to again fall back to the position indicated by 70ᶜ, because this movement would again release the hooks. If desired, however, the pressure used could be strong enough to hold the car on the rails, and the valves 113 could be used merely to lock the hooks in the event that rotation went so far as to cause the lever 70 to take the position indicated by 70°.

One of the features of our invention is shown in Fig. 3. It will be noted that by our construction after pressure is open to the tanks 55 to lower the hooks, such pressure will stay on the pistons 24 for some length of time, for example, during about 90 degrees of rotation or longer. This arrangement is a distinct improvement and advantage over other forms of car holding mechanism in which the hooks are finally and permanently set in position before the cage A commences to rotate. With such a construction there is no further lowering of the hooks after rotation of the cage has commenced. The hooks, as shown in Fig. 2, on one side of the car are somewhat longer than those on the other. These longer hooks are necessary on the side of the dump that is raised in rotation, because of the sideways movement of the track 14 on the rollers 25 as described above. Since the sideways sliding or rolling movement of the car is away from the hooks on this side, they must be somewhat longer so that they will still engage with the car body after it is moved to the side. Since they are somewhat longer they project, in cases where the car body is wide, quite far inwardly over the body of the car, as shown in Fig. 3. In such cases, when the car is in its normal upright position and rather fully loaded with material such as is indicated by 120, the end of the hook 19 will engage with such material and be prevented from being lowered down into contact with the car body. As the cage rotates, the material 120 falls away from under the hook, and unless means are provided for continually lowering the hook during the rotation of the cage, as the material thus falls away, the hook will not engage with the car body. By our improved arrangement, as described above, the downward pressure on the hooks 19 is continued during about 90 degrees of rotation, with the result that if the hook 19 is at first prevented by material 120 from being lowered into contact with the car body, the continued downward pull on the hook will pull it down into such engagement, as the material 120 slides and rolls away from under it.

While we have shown and described certain embodiments of our invention, it is to be understood that it is capable of many modifications. Changes therefore in the construction and arrangement may be made without departing from the spirit and scope of the invention as disclosed in the appended claims, in which it is our intention to claim all novelty inherent in our invention as broadly as possible in view of the prior art.

What we claim as new and desire to secure by Letters Patent is:

1. In combination with a rotatable cage adapted to hold a car to be dumped, means on the cage for holding the car on the rails during rotation of the cage, independent power means on the cage for operating the car holding means, said independent power means including a cylinder with a movable piston therein and fluid under pressure, and means automatically operated by rotation of the cage for causing the independent power means to operate the car holding means.

2. In combination with a rotatable cage adapted to hold a car to be dumped, a movable hook on the cage adapted to be lowered into contact with the car to hold the car on the rails during rotation of the cage, a pressure cylinder on the cage, a movable piston in the pressure cylinder connected to the hook, a fluid compressor, a pipe connection between the fluid compressor and the pressure cylinder, a valve in said pipe connection, and means automatically operated by rotation of the cage for moving said valve.

3. In combination with a rotatable cage adapted to hold a car to be dumped, a movable hook on the cage adapted to be lowered into contact with the car to hold the car on the rails during rotation of the cage, a pressure cylinder on the cage, a movable piston in the pressure cylinder connected to the hook, a fluid compressor, a pipe connection between the fluid compressor and the pressure cylinder, a valve in said pipe connection having one position adapted to admit fluid under pressure to said pressure cylinder to move the piston to lower the hook, and having another position adapted to lock fluid under pressure in said cylinder, and means automatically operated by rotation of the cage for moving said valve.

4. In combination with a rotatable cage adapted to hold a car to be dumped, a movable hook on the cage adapted to be lowered into contact with the car to hold the car on the rails during rotation of the cage, a pressure cylinder on the cage, a movable piston in the pressure cylinder connected to the hook, a fluid compressor, a pipe connection between the fluid compressor and the pressure cylinder, a valve in said pipe connection having one position adapted to admit fluid under pressure to said pressure cylinder to move the piston to lower the hook, and having another position adapted to lock fluid under pressure in said cylinder, and means automatically operated by rotation of the cage for moving said valve first to said first mentioned position and then to said second mentioned position.

In witness whereof we have hereunto set our hands and seals this 23 day of June, 1921.

GEORGE N. SIMPSON. [L. S.]
ARTHUR M. SIMPSON. [L. S.]